(12) United States Patent
Monahan et al.

(10) Patent No.: US 6,394,247 B1
(45) Date of Patent: May 28, 2002

(54) COMPLAINT ONE WAY OVER-RUNNING CLUTCH PULLEY

(75) Inventors: Russell E. Monahan, Ann Arbor; Robert Frayer, Gregory; Jonathan M. Adler, Dexter; Thomas W. Houtman; Randall K. King, both of Ann Arbor, all of MI (US)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/583,838

(22) Filed: May 31, 2000

(51) Int. Cl.[7] ............................................. F16D 13/12
(52) U.S. Cl. ................... 192/41 S; 192/81 C; 192/84.8
(58) Field of Search ........................ 192/41 S, 81 C, 192/84.8; 474/135, 74, 903

(56) References Cited

U.S. PATENT DOCUMENTS

| | | |
|---|---|---|
| 4,473,362 A | 9/1984 | Thomey et al. |
| 4,583,962 A | 4/1986 | Bytzek et al. |
| 4,689,037 A | 8/1987 | Bytzek |
| 4,698,049 A | 10/1987 | Bytzek et al. |
| 4,725,260 A | 2/1988 | Komorowski et al. |
| 4,816,012 A | 3/1989 | Bytzek |
| 4,824,421 A | 4/1989 | Komorowski |
| 4,886,484 A | 12/1989 | Hanes |
| 4,973,292 A | 11/1990 | Mevissen |
| 5,139,463 A | 8/1992 | Bytzek et al. |
| 5,156,573 A | 10/1992 | Bytzek et al. |
| RE34,543 E | 2/1994 | Komorowski |
| RE34,616 E | 5/1994 | Komorowski et al. |
| 5,598,913 A | 2/1997 | Monahan et al. |
| 5,722,909 A | 3/1998 | Thomey |
| 5,919,107 A | 7/1999 | Stepniak |
| 6,044,943 A | 4/2000 | Bytzek et al. |
| 6,071,206 A | 6/2000 | Monahan et al. |
| 6,083,130 A | 7/2000 | Mevissen et al. |

Primary Examiner—Charles A Marmor
Assistant Examiner—Saúl Rodríguez
(74) Attorney, Agent, or Firm—Brinks Hofer Gilson & Lione

(57) ABSTRACT

An over-running cluch pulley in which a pulley sheave and hub cooperate to define a composite inner cylindrical surface and in which a mechanism adds compliance to the system in order to lessen the abruptness of lock-on in the system.

24 Claims, 4 Drawing Sheets

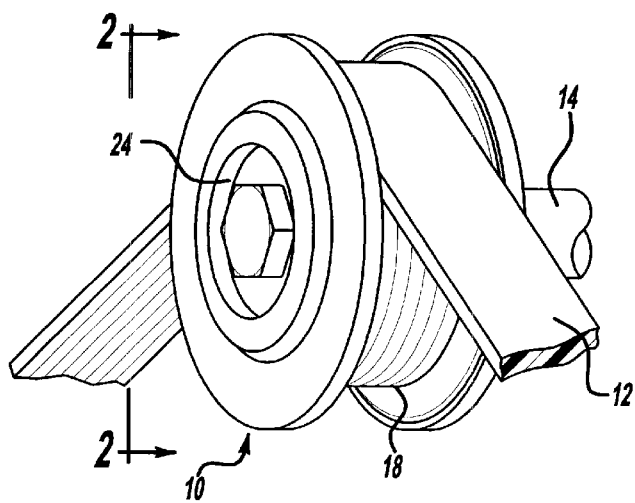
*Figure - 1*
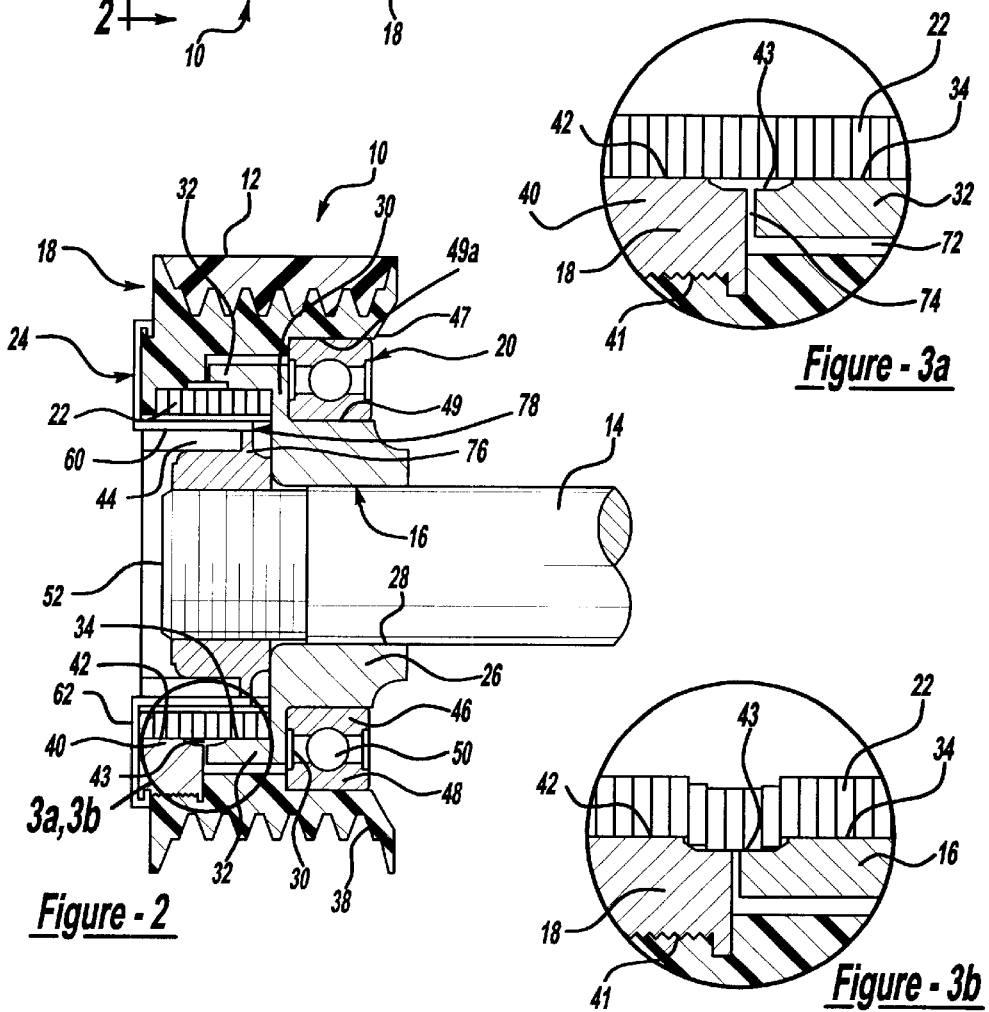
*Figure - 2*
*Figure - 3a*
*Figure - 3b*

COMPLAINT ONE WAY OVER-RUNNING CLUTCH PULLEY

BACKGROUND OF THE INVENTION

1. Field of the Invention

This invention generally relates to pulleys. More particularly, the present invention relates to an over-running clutch pulley which has particular application within an engine accessory system including an automotive alternator.

2. Description of the Prior Art

During operation of an engine, a belt drive system is sometimes used to power and operate the various accessory devices including, but not limited to, an alternator which provides electrical power to the vehicle. While several type of belt drive systems are in use, the system which is currently in favor is known as a serpentine drive system. Serpentine drive systems generally include a drive pulley connected to the crankshaft of the automobile's internal combustion (I.C.) engine and a ribbed belt trained about the drive pulley. The belt is also trained about one or more driven pulleys which are in turn connected to the input shafts of the various accessories. An automatic belt tensioner is also provided to maintain the tension of the belt within the proper range. Most driven pulleys are provided in a one-piece design. These pulleys have no over-running capabilities, meaning that the pulley is rigidly mounted to rotate with the accessory input shaft. When the input shaft of the accessory device is running at high speed (up to 22,000 rpm for an alternator), a significant amount of inertia is built up within the accessory device. As a result of the combined inertia and the lack of over-running capabilities, relative slipping between the pulley and the belt can occur if the belt decelerates too quickly. If significant slipping of the belt occurs, an audible squeal will be produced. Not only is a squealing belt annoying from an auditory standpoint, but it also undesirable from a mechanical standpoint since it produces undue wear on the belt itself.

In a typical driving situation, the accessory belt will experience instances of large deceleration, such as during in a 1–2 up shift during wide-open throttle acceleration. The situation is made even worse if the throttle is closed or "backed out" immediately after the transmission has been shifted. In these situations, the belt decelerates very quickly while the pulley, with the high inertia from the accessory, keeps rotating very quickly in spite of the friction between the pulley and the belt. Other drawbacks and potential problems of present designs include: belt resonance, flutter and flap; long unsupported belt lengths; torque fluctuations from loading and unloading of accessories; and steering shutter.

In attempting to cure the slipping of the belt and its associated problems, various design proposals have been put forward. One proposed design includes the use of higher belt tensions. However, in these designs the belt tends to wear even more quickly. Additionally, the bearings associated with the input shaft of the accessory also have shown greater wear and a shortened useful life. Various other tensioner constructions have been proposed, but those tensioners have generally exhibited poor performance and were costly to implement.

Attempts to cure the belt slippage and squeal problem have also proceeded in another direction. While early driven pulleys were constructed in a one-piece design, newer pulley designs have been proposed where the driven pulley itself exhibits an "over-running" capability. This allows the driven pulley to rotate relative to the input shaft of the accessory and therefore accommodate the inertia built up within the accessory.

U.S. Pat. No. 4,725,259 issued to Miyata discloses a construction where the driven pulley is mounted to the input shaft via a one-way clutch. The clutch only engages when the angular velocity of the pulley is accelerating. Otherwise, the clutch slips relative to the input shaft of the accessory. This design is intended to smooth out the recurring fluctuations of instantaneous velocity in the belt that is typical of an I.C. engine. The design smoothes out the corresponding recurrent instantaneous slipping of the belt relative to the driven pulley. No specific constructions for the Miyata one-way clutch are given in the disclosure of this patent.

U.S. Pat. Nos. 5,139,463 and 5,156,573, issued to Butzek et al., disclose alternator pulley constructions in which a coil spring is disposed in a space between a hub attached directly to the accessory input shaft and a pulley mounted for relative movement exteriorly of the hub.

In the '463 patent, the two ends of the coil spring are respectively bent radially inward and radially outward so that one will engage the hub and the other will engage the pulley. In this patent, the spring is wound so that when a positive torque is applied from the belt to the pulley, the rotational movement of the pulley will be transferred to the input shaft of the accessory as a result of the spring "winding-up" and the tangs engaging both the hub and pulley. Whenever negative torque is provided from the belt to the pulley, the spring enables the input shaft from the accessory and the hub to rotate relative to the pulley.

In the '573 patent, the coil spring has one end bent radially outward. Additionally, the spring includes two sets of volutes, an intermediate set located between the other set and the bent end of the spring. The diameter of the hub and the inner diameter of the non-intermediate volutes are such that the volutes engage the hub when the pulley is being driven by the belt. When a negative torque is established between the alternator pulley and the input shaft, the volutes loosen with respect to the hub and allow slipping to occur. Importantly, the Butzek design of the intermediate volutes allows for a "resilient rotational motion" to ease the shock loading between the pulley and the hub but can cause fatigue problems in the spring.

U.S. Pat. No. 5,598,913 discloses a one way over-running clutch pulley in which a coil spring engages a composite cylindrical surface which is defined by both the sheave and hub. The spring is oriented so that torque is transferred from the sheave to the hub when the sheave is driving the hub. The spring allows slip to occur between these two components during deceleration of the drive belt's recurring speed and torque fluctuations.

While the clutch pulleys of these patents may operate adequately in some respects, they have drawbacks in others. First, some prior art pulleys have experienced resonant vibration problems, especially during idle and sub-idle conditions. Another problem in over-running pulleys is hard lock-up. During engine idle, the large torque fluctuations which are characteristic of the internal combustion engine are smoothed out by an over-running pulley such as the pulley disclosed in the '913 patent. During the brief periods of deceleration, the pulley over-runs. Because of its stiff nature in the drive direction, the hub would over (theoretically) rotate slower than the sheave's input speed of the alternator and pulley (or sheave and hub) are equal. Such immediate and hard lock-up can cause its own noise and vibration. These designs are typically much larger than the standard solid pulleys and can result in serious packaging problems.

In view of the foregoing limitations and shortcomings of the prior art devices, as well as other disadvantages not specifically mentioned above, it should be apparent that there still exists a need for an improved one-way, over-running clutch pulley.

It is therefore a primary object of this invention to fulfill that need by providing a one-way over-running clutch pulley which overcomes the limitations and shortcomings of the prior art. Such a clutch pulley would find particular applicability with the accessory drive system of an automobile where it would allow for relative slip or compliancy between the pulley sheave and hub at the onset of lock-up. It is also an object of the present invention to provide a one-way, over-running clutch pulley which accommodates large decelerations of the belt so as to reduce or eliminate the belt squeal and wear that normally occur as a result of the belt slipping relative to the pulley and other problems that result from resonant vibrations of the belt.

Another object of this invention is to provide an over-running clutch pulley which utilizes centrifugal forces in a positive manner during operation so as to enhance the transfer of torque to the accessory input shaft.

Still another object of this invention is to provide a one-way, over-running clutch pulley incorporating an internal spring to provide for the limited slip in the clutch pulley.

A related object of this invention is to provide a one-way, over-running clutch pulley which exhibits enhanced heat dissipating capabilities.

Another object of the present invention is to provide an over-running clutch pulley of a lightweight construction and low cost, yet which is of a durable construction.

SUMMARY OF THE INVENTION

Briefly described, these and other objects of the invention are accomplished according to the present invention by providing what is hereinafter referred to as a compliant, one-way over-running clutch pulley that is intended for mounting to a rotational input shaft of a device, such as the alternator of an automobile. While the clutch pulley of the present invention is being specifically discussed in connection with automotive vehicles, it will be easily seen that the present invention has general applicability in a wide range of situations, particularly where it is desirable to provide compliance between a rotational input member and an output member to eliminate belt squeal and resonant vibrations.

The clutch pulley of the present invention is engaged by a driving member, such as a belt, which is rotatably being driven. The clutch pulley has several main components including an inner pulley hub, an outer pulley sheave, a bearing and a spring.

The pulley hub includes a first portion through which a mounting bore is defined. The bore is sized and shaped to receive the input shaft of the driven device, such as an alternator in a vehicle accessory system. The input shaft of the driven device is mounted to the pulley hub so that relative rotational movement between the pulley hub and the input shaft is prevented. Accordingly, rotation of the pulley hub will cause rotation of the input shaft of the driven device, e.g. the alternator. An axial extension off of the first portion of the pulley hub defines a first inner surface which is generally cylindrically configured and is generally coaxial with the bore of the hub and the shaft of the accessory.

The pulley sheave has a first portion which is adapted to engage the driving member which causes rotation of the pulley sheave. A radial flange extends off of the first portion of the pulley sheave and defines a second inner surface, also generally cylindrically configured. The second inner cylindrical surface has a diameter which is substantially the same as the diameter of the first inner cylindrical surface of the hub. The first and second inner cylindrical surfaces are coaxial with one another and adjacently located so that they cooperate to define a common or composite inner cylindrical surface. This composite inner cylindrical surface defines a spring receiving cavity. This cavity also allows for use of a retaining nut to hold the pulley to the input shaft of the driven device or can include a threaded fastener integral to the hub.

In an effort to decrease the overall weight of the pulley, in one embodiment of the present invention the sheave has a composite construction. More specifically, the majority of the sheave is made of injection molded plastic while a steel insert is overmolded into the plastic and provides a hard surface (for contact with the wrap spring), a lip to axially restrain the spring and another surface for receiving the dust cap or seal of the pulley.

The pulley sheave is mounted to the pulley hub by a bearing assembly which permits relative rotation between the two components. The bearing assembly is located between concentric portions of the pulley sheave and hub.

Received in the spring cavity mentioned above is a wrap or coil spring. The freestanding outer diameter of the spring is slightly greater than the diameter defined by the inner cylindrical surfaces. As a result, the spring is in an interference and frictional engagement with the steel insert portion of the composite inner cylindrical surface and retained by the radially outward contact normal force inherently exerted by the spring. The winding of the spring is oriented in a direction that compressively loads the spring whenever the pulley sheave is positively driven or accelerated relative to the pulley hub. This action tends to unwind the spring and would effectively increase its diameter if it were not restrained by the inner cylindrical surfaces of the sheave and hub. Conversely, the diameter of the spring effectively decreases when the pulley sheave is negatively driven or decelerated relative to the hub.

The effective increase in the diameter of the spring during compressive loading, positive driving and acceleration of the pulley sheave relative to the pulley hub causes the spring to exert an increased radially outward contact normal force on the inner cylindrical surfaces of the sheave and hub. The normal forces, which result in engagement of the spring with inner cylindrical surfaces, increase exponentially along the spring helix reaching a maximum at the midpoint. Because the normal forces determine the frictional forces and therefore the torque load which can be carried by the present clutch pulley, the initial normal force caused by the interference fit between the spring and inner cylindrical surfaces obviates the need for a tang on the spring if a sufficient number of spring volutes engage both portions of the composite inner cylindrical surface. With this increased normal force being applied to both the first and second inner cylindrical surfaces, these surfaces effectively become "locked" together by the spring and torque is transferred from the input member (belt) through the pulley sheave and hub to the shaft of the driven device. Depending on the amplitude and frequency of these recurring speed and torque fluctuations, a resonant condition may be set up in the drive belt, causing a flapping motion resulting in noise and excessive belt wear.

To eliminate the resonant condition, the present invention provides for a construction which allows a "softer" or more compliant coupling between the spring and the surfaces, and therefore between the sheave and the hub. In one embodiment of the invention, compliancy is accomplished by defining a recess area or scallop where the first and second inner cylindrical surfaces meet. During a non-locked condition, that portion of the spring adjacent to the recess will not be in contact with the inner cylindrical surface. As lock-up initiates, the spring must first expand into the recess, allowing relative rotation to occur between the sheave and hub and delaying or easing the harshness and immediacy of the lock-up.

In a second embodiment of the invention, the recess of the first embodiment is formed by tapered sections which bridge the first and second inner cylindrical surface.

In a third embodiment, the spring itself is instead formed with a raised or reduced cylindrical surfaces.

When a deceleration or negative driving is experienced between the pulley sheave and the pulley hub, such as during a wide open throttle 1–2 up shift, the shaft of the driven device will not immediately respond to the deceleration because of the inertia built up within the driven device and the pulley hub will over-run the pulley sheave. This causes the spring to unload and "wind-up", effectively decreasing the diameter of the spring. Even a very slight reduction in the effective diameter of the spring results in a corresponding reduction in the normal force exerted by the spring on the two inner cylindrical surfaces which is sufficient to "unlock" the first and second inner cylindrical surfaces from each other and permitted relative rotation between the two surfaces. The pulley hub can therefore rotate under the inertia of the driven device via the shaft while the pulley sheave can rotate under the influence of the input member or belt.

Relative rotation in this manner reduces or eliminates relative slipping between the belt and the pulley and, importantly, associated squeal and premature belt wear problems.

A cap is fitted to the opening of the spring cavity. In addition to a radial face the cap includes an axial sleeve in close fit engagement with the inner diameter of the spring. As provided, the sleeve can be used to retain lubricant in the immediate vicinity of the spring and, in combination with the radial face of the cap, prevents entry of dirt, water, salt and other contaminants.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

FIG. 1 is a perspective view of a one-way, over-running clutch pulley embodying the principles of the present invention;

FIG. 2 is a sectional view taken substantially along line 2—2 in FIG. 1 illustrating in detail the construction of the clutch pulley of the present invention;

FIG. 3a is an enlarged sectional view of the circled area 3 in FIG. 1, illustrating the recessed area of the present invention.

FIG. 3b is an enlarged sectional view similar to FIG. 3a, showing the expansion of the spring into the recessed area;

DETAILED DESCRIPTION OF THE PREFERRED EMBODIMENT

Figure 4:
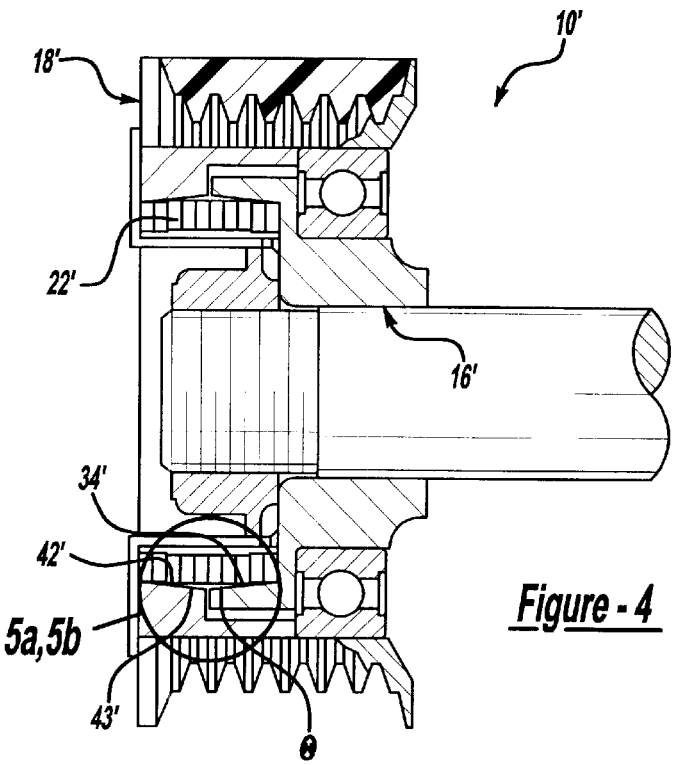
FIG. 4 is a sectional view taken substantially along line 2—2 in FIG. 1 illustrating in detail the construction of an alternate embodiment of the clutch pulley of the present invention.

Referring now in detail to the drawings, shown in FIGS. 1 and 2 is a one-way, over-running clutch pulley according to the principles of the present invention and generally designated at 10. The clutch pulley 10 has five principal components. These include a pulley hub 16, a pulley sheave 18, a bearing 20, a spring 22, and an end cap 24.

While shown in a generic application where a belt 12 provides a rotational input to the clutch pulley 10 and a shaft 14 delivers the rotational output from the clutch pulley 10, numerous specific applications can be envisioned where the clutch pulley 10 of the present invention would have applicability. For example, the belt 12 could be the ribbed serpentine belt of a motor vehicle accessory drive system and the shaft 14 could be the input shaft into an alternator used to provide power to the various electrical systems of the vehicle during its operation. It is in this particular application that the present invention will be described However, it is not intended for the scope of the present invention specifically to be solely limited to motor vehicle applications. By way of illustration and not further limitation, an additional application in which the clutch pulley 10 of the present invention could be utilized includes wave power generation or any situation where a use of a one-way clutch is necessitated.

Referring now to FIG. 2, the pulley hub 16 includes a first cylindrical portion 26 through which a bore 28 is centrally defined. The diameter of the bore 28 approximates the outer diameter and shape of the shaft 14 and is intended to receive the shaft 14 therein. The shaft 14 and the bore 28 can have various cross-sectional shapes and can even be round if otherwise provided with means, such as a key or clamping nut 55, to aid in preventing relative rotation between the pulley hub 16 and the shaft 14.

Formed on the outboard end of the first portion 26 is a radially extending flange 30. The flange 30 terminates in an axial extension 32 which is coaxial with the bore 28 and which defines an inner cylindrical surface 34, the purpose of which will be more fully understood from the discussion which follows.

The pulley sheave 18 is located generally exteriorly about the pulley hub 16 and is rotatably supported thereon by the bearing 20. The bearing 20 is illustrated as a rolling element bearing whose inner race 46 is mounted onto an exterior surface or seat 49 of the first portion 26 of the pulley hub 16. The outer race 48 of the bearing 20 is secured to an inner surface or seat 49 on a first portion 47 of the pulley sheave 18. The rolling element 50, which is illustrated as a ball bearing, is located between the inner and outer races 46 and 48. While not shown, the bearing 20 is usually permanently sealed so that additional lubrication over its useful life is not necessary. Obviously, other varieties of bearings 20, journal bearings for example, could be used in the present invention.

A grooved channel 38 is defined in the exterior of a first portion 47 of the pulley sheave 18 and is intended to receive the ribbed belt 12 therein. Extending radially inward from the outboard end of the sheave 18 is a radial flange 40 whose inner radial face defines an inner cylindrical surface 42. The inner cylindrical surface 42 is located so as to be adjacent to the inner cylindrical surface 34 of the pulley hub 16 and has a diameter which is substantially the same. In this manner, the inner cylindrical surfaces 34 and 42 cooperate to define a composite cylindrical surface. As used in this context, the term composite cylindrical surface is referring to the inner cylindrical surfaces 34 and 42 in conjunction with one another.

As illustrated in the lower half of FIG. 2, the radial flange 40 can be provided as a steel insert. The insert can be overmolded into the first portion 36 of the sheave 18, which is of an injection molded material, i.e. plastic, and thus provide the sheave 18 with a composite construction. The insert is provided with a knurled, slotted, grooved or otherwise featured outer surface 41 to provide for good bonding to the overmolded plastic. The insert also provides a hardened surface, the inner cylindrical surface 42, for contacting the wrap spring, and a lip 39 or similar feature, for retaining the sealing cap 24 as further discussed below.

On the outboard end of the axial extension 32 of the hub 16, a scallop, recess, taper or similar feature, is formed in the inner cylindrical surface 34. Similarly, the inboard end of the radial flange 40 is likewise formed with such a feature or features in its inner cylindrical surface 42. Together the scallops, recesses, tapers, etc., in both inner cylindrical surfaces 34 and 42 cooperate to define a recessed volume 43 whose effective diameter is greater than that of the remainder of the composite inner cylindrical surface.

The spring 22 is located within a spring receiving cavity 44 defined by the composite cylindrical surface and is a wrap or coil spring. In its uncompressed or freestanding condition, the spring 22 has a diameter which is slightly greater than the diameter of the composite cylindrical surface. When received in the cavity 44, the spring 22 thus frictionally engages with and exerts a radially outward normal force on both of the inner cylindrical surfaces 34 and 42. Generally speaking, during overrunning, the wrap spring 22 will slip on the inner cylindrical surfaces 34 and/or 42. During engagement, the effective diameter of the spring 22 increases causing it to bind on the inner cylindrical surfaces 34 and/or 42 and, as further discussed below expand into the recessed volume 43.

Illustrated by FIGS. 3a and 3b, applying more driving torque forces the spring 22 to expand into the recessed volume 43 created by the larger diameter sections in the inner cylindrical surfaces 34 and 42 of the hub 16 and sheave 18. As the spring 22 is forced into the recessed volume 43, extra torque is required to unwind the spring 22 and a limited amount of relative motion occurs between the hub 16 and sheave 18 as the sheave 18 accelerates past and rotates faster than the hub 16. This limited amount of relative rotation occurring when the sheave 18 rotates faster in the drive direction than the hub 16 provides the compliancy referred to herein. Compliancy is experienced by the system until the spring 22 has fully expanded into contact with the surfaces defining the recessed volume 43, at which point the pulley 10 locks up in the drive direction. This compliance or delayed onset of lock-up softens the transition between the "unlocked" and "locked" states of the over-running clutch 10, providing dampening and eliminating additional vibration, belt slippage and wear.

To retain the clutch pulley 10 on the shaft 14, the outboard end of the shaft 14 is threaded 52. A retainer nut 54 engages with these threads 52 and traps the clutch pulley 10 on the shaft 14 with a nut flange 55 (whose diameter exceeds that of a bore 28) that engages the axial face of the hub 16. Alternatively, the hub 16 could be provided with integral threads.

The dust seal or cap 24 is mounted so as to extend into the cavity 44. As such the cap 24 includes an axial sleeve 60 and a radial flange 62 (which extends along the outboard axial face 57 of the sheave 18 and over the lip 39 of the insert). The exterior diameter of the sleeve 60 is slightly larger than the inner diameter of the spring 22 so that the sleeve 60 is immediately adjacent to the innermost portions of the spring 22. The lip 23 restrains axial movement of the spring in the outboard direction while the axial face of the hub's radial flange 30 restrains axial movement in the inboard direction. Obviously, the cap 24 may be mounted in other manners as well.

During operation, the clutch pulley 10 is driven by the belt 12 which may in turn be driven by the crankshaft pulley (not shown) of an internal combustion engine (not shown). Rotation of the belt 12 therefore causes a corresponding rotation of the pulley sheave 18. If the pulley sheave 18 is accelerated relative to the pulley hub 16, the clutch pulley 10 of the present invention will transfer torque from the pulley sheave 18 to the pulley hub 16 via the spring 22 and subsequently to the shaft 14 where it can be used to drive the armature (not shown) of an alternator (not shown). When the pulley sheave 18 is significantly decelerated relative to the rotational speed of the pulley hub 16, the clutch pulley 10 of the present invention allows for the pulley hub 16 to over-run or slip relative to the pulley sheave 18 as the inertia from the armature of the alternator prevents the pulley hub 16 from decelerating as fast as the pulley sheave 18. Previously, where no slip occurred in the pulley itself, the deceleration of the belt and the inertial over-running of the pulley caused the belt to squeal as it slipped relative to the pulley. Not only was this squeal annoying, but the slippage also creates additional wear on the belt. Over-running of the sheave relative to the hub can also eliminate many resonant vibration problems in the accessory drive system, providing quieter operation and longer belt life.

In the present invention, torque is transferred and slip is permitted because of the spring 22 and the specific clutch pulley 10 construction. To provide these complementary functions, the coil spring 22 is oriented in the cavity 44 so that it is "wound" in a direction which fosters both the transferring torque and the providing of slip. The unwinding of the spring 22 is such that when the pulley sheave 18 is positively driving or accelerating relative to the pulley hub 16, the frictional engagement of the spring 22 with the inner cylindrical surface 42 of the pulley sheave 18 causes the spring to experience compressive loading and unwinding. During compressive loading, the spring 22 expands into recess 43 and, as the spring 22 is forced into the recess 43, extra torque is required to wind the spring 22, creating compliance and additional dampening in the system. Expanding of the volutes of the spring 22 is illustrated in FIGS. 3a and 3b. By absorbing energy in a transient torque condition, the recess 43 enables the spring 22 to more gradually couple the cylindrical surfaces 34 and 42, softening the "lock-up" of the clutch 10 and eliminating abrupt transition between the "unlocked" and "locked" states. As the spring 22 is expanding into the recess 43, the pulley sheave 18 is permitted to rotate relative to the pulley hub 16 in a limited amount. Preferably 3–6° of relative rotation or compliancy occurs between the hub 16 and sheave 18 before complete lock-up, although more or less compliance can be provided if required by the specific application. As the coil spring 22 is unwound, its freestanding outer diameter would effectively increase if it were not restrained by the inner cylindrical surfaces 34 and 42. The frictional forces between the inner cylindrical surfaces 34 and 42 and the coils or volutes of the spring 22 result in increased compressive forces being built-up in the spring 22 along the helix from either end of the spring thereby increasing the radially outward normal force being exerted on both the inner cylindrical surfaces 42 and 34 of the pulley sheave 18 and hub 16.

As the normal force continues to increase, the multiplicitive effect along the spring 22 causes the pulley sheave 18 to lock to the pulley hub 16 via the spring 22 fostering the transfer of torque from the belt 12 to the shaft 14. Additionally, by having the spring 22 engage inner cylindrical surfaces 34 and 42 of the pulley sheave 18 and hub 16, centrifugal forces induced by rotation of the clutch pulley 10 are utilized to further enhance and increase the radially outward normal force exerted by the spring 22. One additional benefit of this engagement between the exterior of the spring 22 and the interior cylindrical surfaces 34 and 42 is that any lubricants used with the spring 22 are retained on the spring 22 and inner cylindrical surfaces 34 and 42 under the influences of the centrifugal forces and are not drawn away.

When the speed of the belt 12 is reduced, the inertia acting on the shaft 14 causes the pulley hub 16 to over-run the pulley sheave 18. The winding direction of the spring 22 causes the effective outer diameter of the spring 22 to be slightly reduced as the spring 22 "winds-up" as a result of the over-running. Corresponding with the reduction in the effective outer diameter of the spring 22, the frictional forces between he inner cylindrical surfaces 34 and 42 and the coils of the spring 22 are reduced as a result in the decrease of the compressive forces along the helix of the spring 22 and the decrease in the radially outward normal force exerted by the spring 22 on the inner cylindrical surfaces 34 and 42. As the spring's effective diameter decreases, the volutes of the spring 22 located within the recess 43 disengage from the recess 43. This, along with the reduction of the remaining volutes of the spring 22, "unlocks" the inner cylindrical surfaces 34 and 42 from each other and the pulley hub 16 is permitted to overrun and rotate relative to the pulley sheave 18.

To reduce wear on the composite surface, inner cylindrical surfaces 34 and 42 may be surface treated by carbonitriding or another technique.

In the event the spring 22 utilized in the present clutch pulley 10 should fail and the coils separate into two or more pieces, the sleeve 60 of the cap 24 operates as a retainer which will maintain the resulting pieces of the spring 22 in position relative to one another. This permits a clutch pulley 10 of the present invention having a failed spring 22 to continue to operate as a solid pulley without a significant loss in performance.

Another feature of this invention is the formation of a wear debris reservoir 72 as a result of the radial clearance between the axial extension 32 of the hub 18 and a radially opposing portion of the sheave 16. Wear debris will be centrifuged through the axial gap 74 between the axial extension 32 of the hub 18 and the inner face of the radial flange 40 of the sheave 16. As wear debris accumulates in the reservoir 72, additional grease is forced back out through the gap 74 and onto the spring 22.

Regarding the size or width of the gap 74, in the preferred embodiment the width of the gap 74 is no greater than one-half of the width of the axial thickness of the wire used to make the spring 22. In one working version of the invention, that width is no greater than 0.0175 inches, the width of an individual wrap of the spring 22 being 0.035 inches.

Figure 5A:
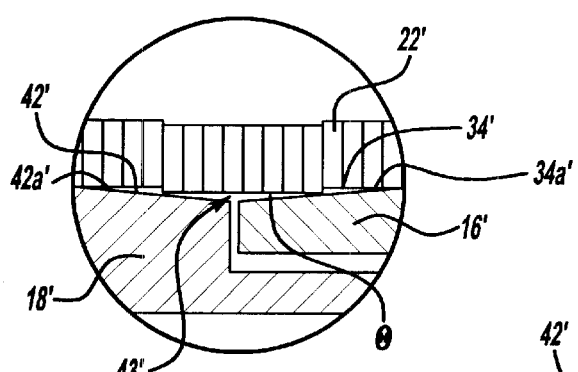
FIG. 5a is an enlarged sectional view of the circled area 5 in FIG. 4, illustrating the shallow angle of the tapers formed in the sheave and the hub.
Figure 5B:
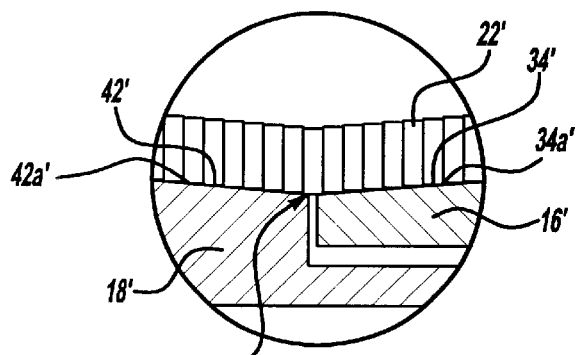
FIG. 5b is an enlarged sectional view taken similar to FIG. 5a, showing the expansion of the spring into the recessed area of the sheave and hub.

A second embodiment of a one-way over-running clutch pulley 10' of the present invention is shown in FIGS. 4, 5a and 5b. FIG. 4 is virtually identical with FIG. 2 except that the sheave 18' is of a one-piece construction and that the recess 43' is defined by the adjacent portion of the inner cylindrical surfaces 34' and 42' and are formed as tapered surfaces, instead of the scallops of the prior embodiment. The surfaces 34' and 42' are formed with opposing shallow angles to create the recess 43'. As seen in FIG. 5a, the spring 22' solidly contacts a flat portion 34a' and 42a' over a significant axial length of the surfaces 34' and 42' because of the shallowness of the angles forming the recess 43'. At a point along these surfaces 34' and 42', the inner diameter of the hub 16' and sheave 18' exceeds the free diameter of the spring 22' and the spring 22' does not fully contact the surfaces 34' and 42' when the clutch pulley 10 is in the disengaged state. When torque is applied in the lock-up direction, the spring 22' unwinds, as in the prior embodiment, becoming larger in diameter in the spring's 22' mid-section area. Eventually, the spring 22' makes contact along the entire length of the shallow recess 43' and surfaces 34' and 42'. At this point, the clutch pulley 10 is fully engaged. Full engagement of the spring 22' with the surfaces 34' and 42' is seen in figure 5b. As with the prior embodiment, as the spring 22' expands into the recess 43', relative rotation between the hub 16' and the sheave occurs, providing compliancy prior to the lock-up of the pulley 10.

Preferably, the depth of the recess 43' is not very large and the angle is such that the volutes are not allowed to expand and move inside each other. If allowed to happen, the integrity of the spring 22' will be compromised, causing buckling and the failure. The actual depth and length defining the recess 43' of the surfaces 34' and 42' obviously must be tailored to the specific application of use to provide the proper amount of compliancy or relative motion before complete lock-up of the spring 22'. If the angle of recess 43' is too shallow, or the depth to small, then not enough compliance would be obtained. An important factor in design is the amount of contact between the spring 22' and the surfaces 34' and 42' and the length and average depth of non-contact between the spring 22' and the surfaces 34' and 42'. The thickness and width of the spring wire, as well as the number of volutes which can expand into the recess 43 can also be a factor in the compliance of the pulley.

Figure 6:
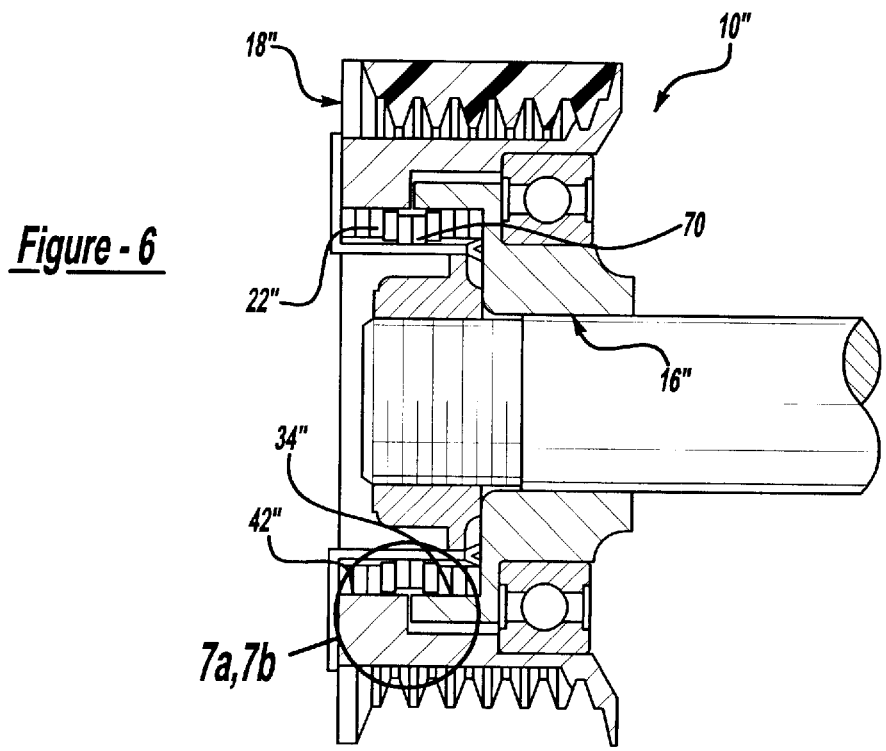
FIG. 6 is a sectional view taken substantially along line 2—2 in FIG. 1 illustrating in detail the construction of a further alternate embodiment of the clutch pulley of the present invetion.
Figure 7A:
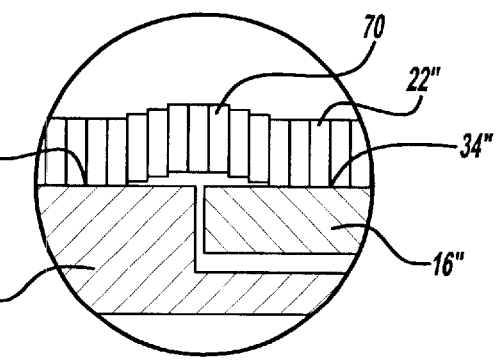
FIG. 7a is an enlarged sectional view of the circled area 7 in FIG. 6, illustrating the smaller diameter spring midsection.
Figure 7B:
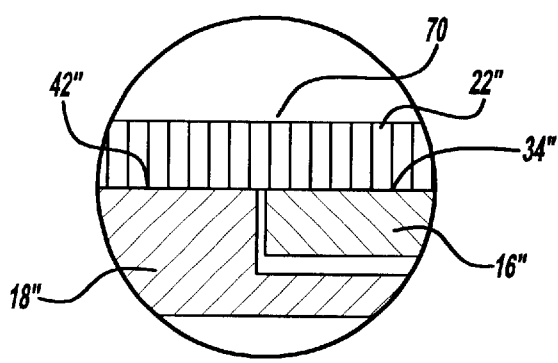
FIG. 7b is an enlarged sectional view similar to FIG. 7a, showing the expansion of the spring midsection.

A third embodiment of the one-way over-running clutch pulley of the present invention is shown in FIGS. 6, 7a and 7b and generally designated at 10". This embodiment of the present invention is a variation of the first two embodiments.

The third embodiment utilizes a varying spring diameter with a hub 16" and sheave 18" having straight inner cylindrical surfaces 34" and 42". As shown in the FIGS. 7a and 7b, a standard spring 22" can be easily modified to become compliant in nature solely through the use of a variable (reduced) diameter midsection 70. Once again, the wrap spring 22" acts as both the clutch and compliant member. The spring 22" features a smaller diameter midsection 70 in the free state. When torque is applied in the driving direction, the mid-section 23 spring volutes will expand outwards until they contact the cylindrical surfaces 34" and 42" of the hub 16" and sheave 18", locking up the pulley. The compliance in this system thus comes from the force required to unwind the spring 22" until the spring's midsection 70 expands outwards to contact the cylindrical surfaces 34" and 42" of the hub 16" and sheave 18". In the over-running direction, the wrap spring 22" will slip on the hub 16" and sheave 18", just as in the first embodiment. As with the first embodiment, the direction which the wrap-spring 22" is wound will determine the direction in which the torque is transmitted.

When utilizing any of the cited embodiments with their compliant features, the pulley becomes a torsional spring in the accessory drive system, affecting the frequency response characteristics of the total system. During any momentary over-running condition, the pulley temporarily decouples from the accessory drive system and negligible torque is transmitted under this condition.

Figure 8:
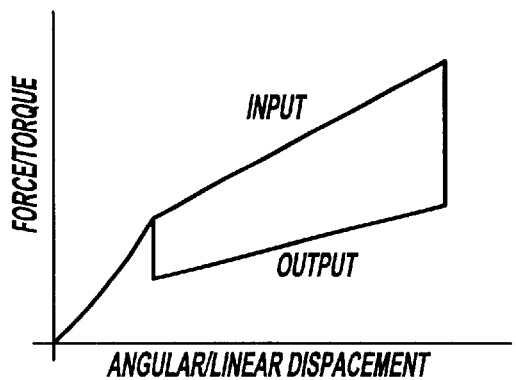
FIG. 8 is a graphical representation of the torque vs. displacement hysteresis curve of one embodiment of the present invention.

Because of the friction between the volutes of the spring (s), the force required to wind up any of these compliant designs, disclosed herein, in the driving direction is greater than the force require to release the system towards the over-running direction. This design effectively provides a variable spring rate over the operating range of the pulley depending on whether the system is being compressed or expanding. This is illustrated by the graph of FIG. 8 which resembles a spring hysteresis curve.

Figure 9:
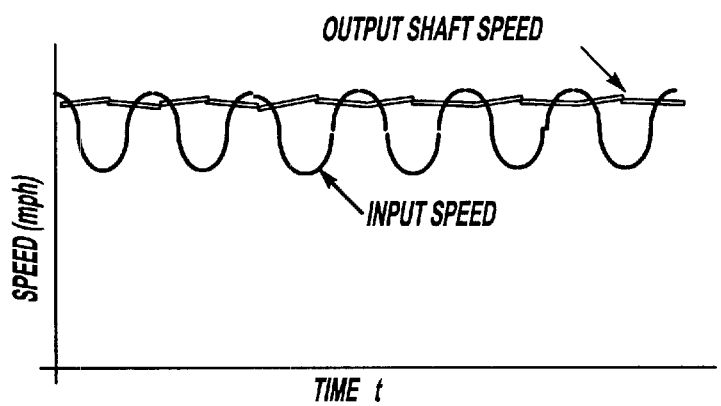
FIG. 9 is a graphical representation of the speed vs. time of the output shaft of one embodiment of the present invention.

The most effective method of adjusting the response of an accessory drive system is through manipulation of the torsional spring rate and dampening coefficient of a pulley mounted on the alternator. These two variables represent the energy absorbed by the system. Therefore, this compliant over-running pulley design can facilitate the reduction of overall accessory drive vibration levels through an effective spring rate tailored for the specific application. Some damping is produced by both of the compliant pulley designs, as shown by the graph of FIG. 9. If properly designed, this damping will also aid in the reduction of overall vibration levels throughout the accessory drive system.

Figure 10:
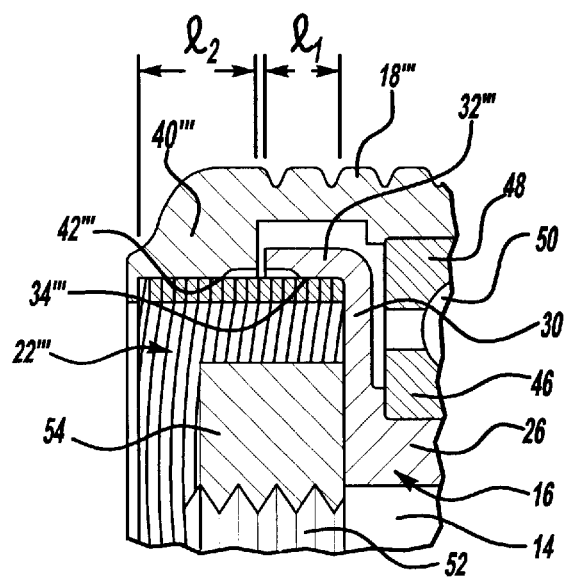
FIG. 10 is an enlarged sectional view of an alternate embodiment of the spring, hub, and sheave illustrating another feature of the present invention.

In a further feature of the present invention, seen in FIG. 10, the relative lengths of the inner cylindrical surfaces 34''' and 42''' are different. In the first embodiment of this invention, it can be seen that the inner cylindrical surface 34 of the pulley hub 16 has a length which is about the same as the length of the inner cylindrical surface 42 of the pulley sheave 18. In the embodiment seen in FIG. 10, the length of the inner cylindrical surface 34''' of the pulley hub 16''' is greater than the length $l_2$ of the inner cylindrical surface of the pulley sheave 18'''. By decreasing the length $l_2$ of the inner cylindrical surface 42''' relative to the length $l_1$ of the inner cylindrical surface 34''', a greater axial length of the spring 22''' is in contact with the pulley hub 16''' than with the pulley sheave 18'''. Slippage will therefore occur on the shorter of the two lengths ($l_2$). This has the benefit of dissipating a greater amount of heat from the clutch pulley 10 through the pulley sheave 18''' which has a greater cooling capacity since it is directly exposed to ambient conditions. This may also allow for the hub 16 to be made with looser tolerances, less expensive steel and not heat treatment. The length of the hub's spring contacting the inner cylindrical surface might be made longer for applications where slip was desired on the hub 16 and not the sheave 18.

In those situations where it is desirable for the pulley hub 16 to drive the pulley sheave 18, the present invention is easily employed. This can be achieved by reversing the winding or orientation of the spring. One of numerous possible applications of this final alternative would be where the clutch pulley 10 is used as the crankshaft pulley in driving the belt 12.

As seen in FIG. 6, the nut 55' may be formed with an integral splash shield 76. The shield 76 is a radial flange positioned radially inward of the cap's axial extension 60. The end of the shield 76 is in close proximity to the cap's axial extension 60, which may be formed of metal with an integral polymer seal 78 on the end of the extension 60. The shield 76 operates as a first measure to limit and inhibit water from reaching the seal 78.

While the above description constitutes the preferred embodiment of the present invention, it will be appreciated that the invention is susceptible to modification, variation and change without departing from the proper scope and fair meaning of the accompanying claims.

What is claimed is:

1. An over-running clutch pulley for mounting to a rotational input shaft of a device, said clutch pulley being driven by a rotational input member adapted to cause rotation of said clutch pulley, said clutch pulley comprising:

a hub with a first portion having a bore of a diameter to receive the input shaft and mount said hub thereon, said hub including a cylindrical extension defining a first inner surface of a first diameter;

a sheave with a first portion adapted to engage said input member for causing rotation of said sheave, said sheave including a second portion defining a second inner surface, said second inner surface having a diameter substantially the same as said first inner surface and being coaxial therewith, said first and second inner surfaces being located adjacent to one another and cooperating to define a composite inner surface;

a bearing located between said sheave and said hub and permitting relative rotation therebetween; and a spring having a free standing outer diameter greater than said first diameter, said spring frictionally engaging said composite inner surface such that said spring is retained in engagement therewith by a radially outward normal force inherently exerted by said spring, said spring oriented in a direction such that positive driving of said sheave relative to said hub causes an increased outward normal force to be exerted against said composite inner surface whereby said sheave and said hub are prevented from rotating relative to one another and torque is transferred from said input member to said input shaft, said orientation of said spring also being such that deceleration of said sheave relative to said hub causes a decreased outward normal force to be exerted by said spring on said composite inner surface thereby permitting said sheave and said hub to rotate relative to one another and allowing said hub to overrun said sheave;

wherein at least one of said first surface and said second surface includes a recessed area to permit limited relative rotation between said sheave and said hub during initial positive driving of said sheave relative to said hub.

2. An over-running clutch pulley as set forth in claim 1 wherein said recessed area is formed in said first inner surface.

3. An over-running clutch pulley as set forth in claim 1 wherein said recessed area is formed in said second inner surface.

4. An over-running clutch pulley as set forth in claim 1 wherein said recessed area is formed in said composite inner surface.

5. An over-running clutch pulley as set forth in claim 1 wherein said recessed area is formed in adjacent portions of said first and second inner surfaces.

6. An over-running clutch pulley as set forth in claim 1, wherein said composite surface is a cylindrical surface.

7. An over-running clutch pulley as set forth in claim 1, wherein said recessed area extends across said first and second inner surfaces.

8. An over-running clutch pulley as set forth in claim 1 wherein said recessed area is formed by curved surfaces in said first and second surfaces.

9. An over-running clutch pulley as set forth in claim 1, wherein said recessed area is formed tapered ends of said first and second inner surfaces to create first and second conical surfaces.

10. An over-running clutch pulley as set forth in claim 1, wherein said spring is a wrap spring.

11. An over-running clutch pulley as set forth in claim 1 wherein said sheave has a composite construction.

12. An over-running clutch pulley as set forth in claim 11 wherein said first portion of said sheave is of a first material and said second portion of said sheave is of a second material.

13. An over-running clutch pulley as set forth in claim 12 wherein said first material is plastic and said second material is metal.

14. An over-running clutch pulley as set forth in claim 1 wherein said first inner surface is of a first length and said second inner surface is of a second length.

15. An over-running clutch pulley as set forth in claim 14 wherein said first length is greater than said second length.

16. An over-running clutch pulley as set forth in claim 1 wherein said second portion of said sheave and said cylindrical extension of said hub cooperate to define an axial gap therebetween, said spring spanning said gap.

17. An over-running clutch pulley for mounting to a rotational input shaft of a device, said clutch pulley being driven by a rotational input member adapted to cause rotation of said clutch pulley, said clutch pulley comprising:

a hub with a first portion having a bore of a diameter to receive the input shaft and mount said hub thereon, said hub including a cylindrical extension defining a first inner surface of a first diameter;

a sheave with a first portion adapted to engage said input member for causing rotation of said sheave, said sheave including a second portion defining a second inner surface, said second inner surface having a diameter substantially the same as said first inner surface and being coaxial therewith, said first and second inner surfaces being located adjacent to one another and cooperating to define a composite inner surface;

a bearing located between said sheave and said hub and permitting relative rotation therebetween; and a spring having a free standing outer diameter greater than said first diameter, said spring frictionally engaging said composite inner surface such that said spring is retained in engagement therewith by a radially outward normal force inherently exerted by said spring, said spring oriented in a direction such that positive driving of said sheave relative to said hub causes an increased outward normal force to be exerted against said composite inner surface whereby said sheave and said hub are prevented from rotating relative to one another and torque is transferred from said input member to said input shaft, said orientation of said spring also being such that deceleration of said sheave relative to said hub causes a decreased outward normal force to be exerted by said spring on said composite inner surface thereby permitting said sheave and said hub to rotate relative to one another and allowing said hub to overrun said sheave;

wherein said spring has a reduced diameter portion to permit limited relative rotation between said sheave and said hub during initial positive driving of said sheave relative to said hub.

18. An over-running clutch pulley as set forth in claim 17 wherein said reduced diameter portion is a middle section of said spring.

19. An over-running clutch pulley as set forth in claim 18 wherein said middle section of said spring extends across from said first inner surface to said second inner surface.

20. An over-running clutch pulley for mounting to a rotational input shaft of a device, said clutch pulley being driven by a rotational input member adapted to cause rotation of said clutch pulley, said clutch pulley comprising:

a hub with a first portion having a bore of a diameter to receive the input shaft and mount said hub thereon, said hub including a cylindrical extension defining a first inner surface of a first diameter;

a sheave with a first portion adapted to engage said input member for causing rotation of said sheave, said sheave including a second portion defining a second inner surface, said second inner surface having a diameter substantially the same as said first inner surface and being coaxial therewith, said first and second inner surfaces being located adjacent to one another and cooperating to define a composite inner surface;

a bearing located between said sheave and said hub and permitting relative rotation therebetween; and a spring having a free standing outer diameter greater than said first diameter, said spring frictionally engaging said composite inner surface such that said spring is retained in engagement therewith by a radially outward normal force inherently exerted by said spring, said spring oriented in a direction such that positive driving of said sheave relative to said hub causes an increased outward normal force to be exerted against said composite inner surface whereby said sheave and said hub are prevented from rotating relative to one another and torque is transferred from said input member to said input shaft, said orientation of said spring also being such that deceleration of said sheave relative to said hub causes a decreased outward normal force to be exerted by said spring on said composite inner surface thereby permitting said sheave and said hub to rotate relative to one another and allowing said hub to overrun said sheave;

wherein said first and second inner surfaces are treated to reduce wear.

21. An over-running clutch pulley as set forth in claim 20 wherein said first and second inner surfaces are carbonitrided.

22. An over-running clutch pulley for mounting to a rotational input shaft of a device, said clutch pulley being driven by a rotational input member adapted to cause rotation of said clutch pulley, said clutch pulley comprising:

a hub with a first portion having a bore of a diameter to receive the input shaft and mount said hub thereon, said hub including a cylindrical extension defining a first inner surface of a first diameter;

a sheave with a first portion adapted to engage said input member for causing rotation of said sheave, said sheave including a second portion defining a second inner surface, said second inner surface having a diameter substantially the same as said first inner surface and being coaxial therewith, said first and second inner surfaces being located adjacent to one another and cooperating to define a composite inner surface;

a bearing located between said sheave and said hub and permitting relative rotation therebetween; and a spring having a free standing outer diameter greater than said first diameter, said spring frictionally engaging said composite inner surface such that said spring is retained in engagement therewith by a radially outward normal force inherently exerted by said spring, said spring oriented in a direction such that positive driving of said sheave relative to said hub causes an increased outward normal force to be exerted against said composite inner surface whereby said sheave and said hub are prevented from rotating relative to one another and torque is transferred from said input member to said input shaft, said orientation of said spring also being such that deceleration of said sheave relative to said hub causes a decreased outward normal force to be exerted by said spring on said composite inner surface thereby permitting said sheave and said hub to rotate relative to one another and allowing said hub to overrun said sheave;

wherein said cylindrical extension of said hub cooperates with said first portion of said sheave to define a grease and wear debris reservoir.

23. An over-running clutch pulley as set forth in claim 22 wherein said reservoir communicates with said spring through an axial gap defined between said cylindrical extension of said first hub and said second portion of said sheave.

24. An over-running clutch pulley for mounting to a rotational input shaft of device, said clutch pulley being driven by a rotational input member adapted to cause rotation of said clutch pulley, said clutch pulley comprising:

a hub including a first portion having a bore of a diameter to receive the input shaft and mount said hub thereon, said hub also including a cylindrical extension defining a first inner surface of a first diameter;

a sheave having a first portion of a first material adapted to engage said input member for causing rotation of said sheave, said sheave also including a radial flange of a second material and defining a second inner surface, said second inner surface having a diameter substantially the same as said first inner surface and being coaxial therewith, said first and second inner surfaces being located adjacent to one another and cooperating to define a composite inner surface;

a bearing located between said sheave and said hub and permitting relative rotation therebetween; and a spring having a free standing outer diameter greater than said first diameter, said spring frictionally engaging said composite inner surface such that said spring is retained in engagement therewith by a radially outward normal force inherently exerted by said spring, said spring oriented in a direction such that positive driving of said sheave relative to said hub causes an increased outward normal force to be exerted against said composite inner surface whereby said sheave and said hub are prevented from rotating relative to one another and torque is transferred from said input member to said input shaft, said orientation of said spring also being such that deceleration of said sheave relative to said hub causes a decreased outward normal force to be exerted by said spring on said composite inner surface thereby permitting said sheave and said hub to rotate relative to one another and allowing said hub to overrun said sheave;

wherein at least one of said first surface and said second surface includes a recessed area to permit limited relative rotation between said sheave and said hub during initial positive driving of said sheave relative to said hub.

* * * * *